(12) United States Patent
Takagi

(10) Patent No.: US 7,090,614 B2
(45) Date of Patent: Aug. 15, 2006

(54) AUTOMATIC TRANSMISSION AND METHOD FOR DETERMINING HYDRAULIC PRESSURE CHARACTERISTICS VALUE FOR AUTOMATIC TRANSMISSION

(75) Inventor: Kiyoharu Takagi, Okazaki (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 189 days.

(21) Appl. No.: 10/890,214

(22) Filed: Jul. 14, 2004

(65) Prior Publication Data

US 2005/0014593 A1   Jan. 20, 2005

(30) Foreign Application Priority Data

Jul. 14, 2003   (JP) ............................. 2003-274118

(51) Int. Cl.
*F16H 31/00* (2006.01)
*F16H 61/48* (2006.01)
*F16H 61/58* (2006.01)

(52) U.S. Cl. ............................ 477/61; 477/62; 475/127

(58) Field of Classification Search ................ 477/51, 477/53, 61, 62, 70, 71; 475/116, 127
See application file for complete search history.

(56) References Cited

U.S. PATENT DOCUMENTS 5,385,511 A * 1/1995 Iizuka ......................... 475/132
6,623,404 B1 * 9/2003 Saito ........................... 477/143
7,001,299 B1 * 2/2006 Takagi et al. ................ 475/116

FOREIGN PATENT DOCUMENTS

| JP | 10-68462 A | 3/1998 |
| JP | 10-96466 A | 4/1998 |
| JP | 2004286183 A * | 10/2004 |
| JP | 2005036875 A * | 2/2005 |
| JP | 2005106131 A * | 4/2005 |
| JP | 2005233372 A * | 9/2005 |

* cited by examiner

*Primary Examiner*—Tisha Lewis
(74) *Attorney, Agent, or Firm*—Buchanan Ingersoll PC

(57) ABSTRACT

An automatic transmission includes a plurality of frictional engagement elements for constructing plural shift stages with combinations of engagement and disengagement thereof, a control portion for controlling the engagement and the disengagement of the frictional engagement elements, a switching device switching to a learning mode for learning a precharge time, and a precharge time determination device. The precharge time determination device transits the frictional engagement elements to an engagement side by maintaining the hydraulic pressure for determining the precharge time at a first precharge pressure while maintaining input shaft rotational speed at the learning mode at a vehicle stop state. A first precharge time defined from a start of maintaining the first precharge pressure until variation of an input value assumes significant is obtained. And a second precharge time at a second precharge pressure is obtained to be set for learning by a predetermined formula.

14 Claims, 8 Drawing Sheets

|      | C1 | C2 | C3 | B1 | B2  | OWC |
|------|----|----|----|----|-----|-----|
| 1st  | ●  |    |    |    | (●) | ●   |
| 2nd  | ●  |    |    | ●  |     |     |
| 3rd  | ●  |    | ●  |    |     |     |
| 4th  | ●  | ●  |    |    |     |     |
| 5th  |    | ●  | ●  |    |     |     |
| 6th  |    | ●  |    | ●  |     |     |
| Rev  |    |    | ●  |    | ●   |     |

AUTOMATIC TRANSMISSION AND METHOD FOR DETERMINING HYDRAULIC PRESSURE CHARACTERISTICS VALUE FOR AUTOMATIC TRANSMISSION

CROSS REFERENCE TO RELATED APPLICATIONS

This application is based on and claims priority under 35 U.S.C. §119 with respect to Japanese Patent Application No. 2003-274118 filed on Jul. 14, 2003, the entire content of which is incorporated herein by reference.

FIELD OF THE INVENTION

The present invention relates to an automatic transmission and a method for determining a precharge time for an automatic transmission.

BACKGROUND

A known hydraulic pressure control system for an automatic transmission forms clutch pressure by directly controlling the hydraulic pressure from hydraulic pressure source with a solenoid valve without adopting an accumulator. With the foregoing known hydraulic pressure control system, the following method is proposed for achieving the smooth and high responsive gearshift feeling by swiftly supplying oil to frictional engagement elements (i.e., frictional clutches, frictional brakes) at shifting. According to the known method, the communication between the frictional engagement elements and line pressure is established at the start of the hydraulic pressure supply, and the direct communication between the frictional engagement elements and the line pressure is blocked when the supply of the hydraulic pressure is completed to hold at pressure corresponding to the pressure of return spring by establishing the communication between the frictional engagement elements and a pressure control valve, that is, the method for transiting to the pressure control after the flow control (i.e., precharge control).

With this regard, because the flow control depends on the individual differences deriving from the movement of a clutch piston, the input and the output volume of the oil, and the leakages of the oil, or the like, and also varies depending on the piece-to-piece individual variations such as the automatic transmission and the engine, a method for compensating for individual differences is desired at the initial state for shipment. It has to be considered that the determination of the hydraulic pressure characteristic value at the initial state for shipment is conducted at the vehicle stop state without running the vehicle, and all conditions for actual shift cannot be reproduced. Particularly, a large volume of the operational fluid is consumed when switching the oil path at the shift and when the transmission is controlled to charge the fluid suddenly at the initial stage of the shift, and the operational fluid is unlikely sufficiently supplied by the pump output volume for the determination of the precharge time, as described in Japanese Patent Laid-Open Publication JP10(1998)-96466A2 and Japanese Patent Laid-Open Publication JPH10(1998)-68462A2. Thus, the decline of the line pressure influences on the tested value further than the piece-to-piece individual variations of the automatic transmission and the engine.

As shown in FIG. 12 showing the oil pump performance used for the automatic transmission, the pump output volume is increased proportional to the rotational speed of a pump. A variable volume type vane pump and a gear pump with flow control valve, or the like, is adopted for controlling the output volume to be minimal to restrain the excessive flow when the engine rotational speed reaches a predetermined rotational speed which corresponds to the unnecessary flow amount determined every automatic transmission. The pump output volume increases in accordance with the increase of the engine rotational speed within the range of the actually required oil amount.

Although it is recognized that the sufficient oil volume is not necessarily ensured at a low rotational range such as at the idling state with the pump of the foregoing kind, in the industry, the loss of the oil pump is apt to be reduced by reducing the size of the oil pump. Accordingly, in case of increasing the precharge pressure at the test for a "garage shift" driving such as the shift from the neutral range (i.e., N range) to the drive range (i.e., D range) and from the neutral range to the reverse range (i.e., R range), the line pressure is declined to largely vary the precharge time for every individual, which requires to decreases the precharge pressure within the range to restrain the influence of the decline of the line pressure.

FIG. 13 shows each oil pressure value during the test operation for obtaining the precharge time of the frictional engagement elements at the actual shift when the turbine rotation is at the rotational speed corresponding to the idling state and the variation of the turbine rotational speed. FIG. 14 shows each oil pressure value during the test operation for obtaining the precharge time of the same frictional engagement elements when the turbine rotation is at the rotational speed corresponding to the normal operation (i.e., normal shift) and the variation of the turbine rotational speed. The oil pressure characteristic value of the frictional engagement elements used at the normal shift may be determined along with the frictional engagement elements for the "garage shift" driving at the stage of initial state for shipment. However, as shown in FIGS. 13–14, in case the test of the oil pressure characteristic value of the frictional engagement elements used at the normal shift is conducted at the idling operation, the decline of the line pressure assumes larger, and the maximal precharge time (max) at the idling operation assumes longer than the maximum precharge time (max) tested at the approximate to the actual condition (shown in FIG. 14). Further, at the idling state, because the consumed flow amount cannot be sufficiently compensated by the pump output volume, the leakage at each portion highly influences to further increases the variations of individual differences of every automatic transmission, which provides the unstable test result. With this regard, although the variations may be restrained by determining the precharge pressure low likewise the test at the "garage shift" driving, it is not preferable to change the precharge pressure of the normal shift for the purpose of the test because the higher precharge pressure is applied at the normal shift in order to swiftly supply the oil to the clutch.

The test (i.e., the setting of the precharge time by learning) is conducted either by operating a throttle pedal by the tester or by the control by the engine. With the operation for learning requiring the operation of the throttle pedal by the operator, the safety of the engine rotation may not be necessarily ensured and producers and dealers may have more burden who have been having other operations for the adjustment requiring large number of man-hour. Further, the control by the engine may not be applicable to the all vehicles and may generate the periodical fluctuation of the engine, which generates further problems for the test guarantee.

A need thus exists for a method for a precharge time determination for automatic transmission and an automatic transmission provided with a determination function for the precharge time with the method thereof.

SUMMARY OF THE INVENTION

In light of the foregoing, the present invention provides an automatic transmission, which includes a plurality of frictional engagement elements for constructing plural shift stages with combinations of engagement and disengagement thereof, a control portion for controlling the engagement and the disengagement of the frictional engagement elements by controlling supplied hydraulic pressure, a switching means for switching a mode to a learning mode for learning a precharge time, and a precharge time determination means activated by switching to the learning mode. The precharge time determination means determines the precharge time based on an input value including at least turbine rotational speed. The precharge time determination means transits the frictional engagement elements to an engagement side by maintaining the hydraulic pressure at the frictional engagement elements for determining the precharge time at a first precharge pressure by controlling the control portion while maintaining input shaft rotational speed of the automatic transmission when the automatic transmission is switched to the learning mode at a vehicle stop state. A first precharge time defined from a start of maintaining the first precharge pressure until variation of an input value deriving from a decline of the turbine rotational speed assumes significant is obtained. And a second precharge time at a second precharge pressure is obtained to be set for learning by a predetermined formula.

According to another aspect of the present invention, an automatic transmission includes a plurality of frictional engagement elements for constructing plural shift stages with combinations of engagement and disengagement thereof, a control portion for controlling the engagement and the disengagement of the frictional engagement elements by controlling supplied hydraulic pressure, a switching means for switching a mode to a learning mode for learning a precharge time, and a precharge time determination means activated by switching the mode to the learning mode. The precharge time determination means determines the precharge time based on an input value including at least turbine rotational speed. The precharge time determination means transits the frictional engagement elements to an engagement side by maintaining the hydraulic pressure at the frictional engagement elements for determining the precharge time at a first precharge pressure Pi by controlling the control portion while maintaining input shaft rotational speed of the automatic transmission when the automatic transmission is switched to the learning mode at a vehicle stop state. A second precharge time tr is obtained to be set for learning by a predetermined correction factor α, the first precharge pressure Pi, a first precharge time ti defined from starting to maintain the first precharge pressure Pi until variation of an input value deriving from a decline of turbine rotational speed assumes significant, and a second precharge pressure Pr. The precharge time tr is obtained to be set for learning with a predetermined formula.

According to further aspect of the present invention, a method for determining a precharge time includes a plurality of frictional engagement elements constructing plural shift stages by combinations of engagement and disengagement thereof, a control portion for controlling the engagement and the disengagement of the frictional engagement elements by controlling supplied hydraulic pressure, and a precharge time determination means for determining a precharge time based on an input value including at least turbine rotational speed. The precharge time determination means transits the frictional engagement elements to an engagement side by maintaining hydraulic pressure at the frictional engagement elements for setting the precharge time at a first precharge pressure by the control portion while maintaining input shaft rotational speed of the automatic transmission at a vehicle stop state. A first precharge time defined from a start of maintaining the first precharge pressure until variation of an input value deriving from a decline of turbine rotational speed is obtained. A second precharge time at a second precharge time is obtained to be set for learning by a predetermined formula.

According to still another aspect of the present invention, a method for determining a precharge time includes a plurality of frictional engagement elements constructing plural shift stages by combinations of engagement and disengagement thereof, a control portion for controlling the engagement and the disengagement of the frictional engagement elements by controlling supplied hydraulic pressure, and a precharge time determination means for determining a precharge time based on an input value including at least turbine rotational speed. The precharge time determination means transits the frictional engagement elements to an engagement side by maintaining hydraulic pressure at the frictional engagement elements for setting the precharge time at a first precharge pressure Pi by the control portion while maintaining input shaft rotational speed of the automatic transmission at a vehicle stop state. A precharge time tr is obtained to be set for learning by a predetermined correction factor α, the first precharge pressure Pi, a first precharge time ti defined from a start of maintaining the first precharge pressure Pi until variation of an input value deriving from a decline of turbine rotation speed assumes significant, and a second precharge pressure Pr. The precharge time tr is determined by a predetermined formula.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
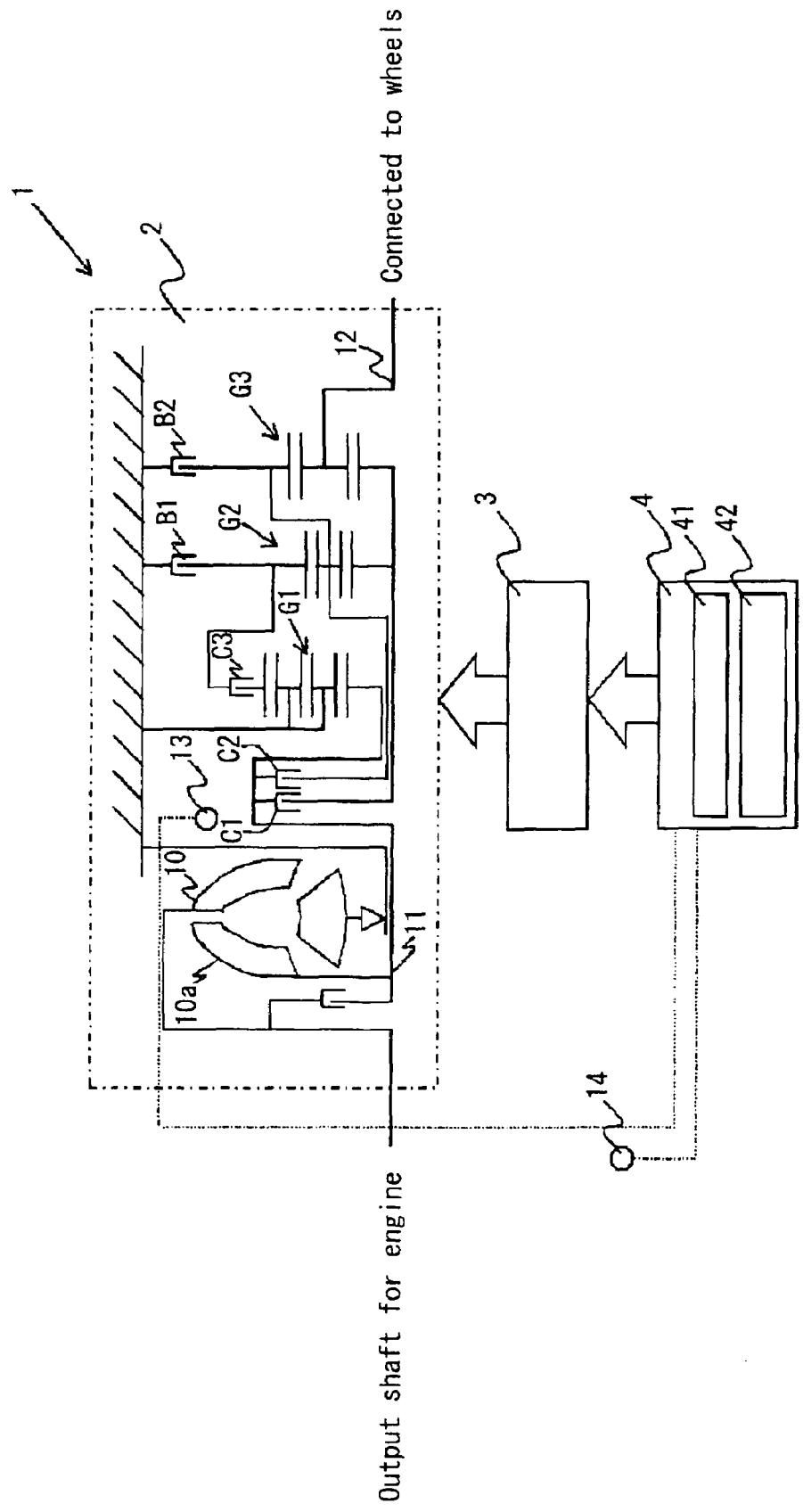
FIG. 1 shows a schematic view of an automatic transmission according to an embodiment of the present invention.

One embodiment of the present invention will be explained with reference to the illustrations of the drawing figures as follows.

As shown in FIG. 1, an automatic transmission 1 includes a transmission body 2, hydraulic pressure control portion 3, and an electronic control portion 4.

The transmission body 2 includes an input shaft 11 connected to a turbine 10a of a torque converter 10, an output shaft 12 connected to wheel side, a double-pinion planetary gear G1 connected to the input shaft 11, single-pinion planetary gears G2, G3, frictional clutches C1, C2, C3 provided between either the input shaft 11 or the double pinion planetary gear G1 and either the single pinion planetary gear G2 or the single pinion planetary gear G3. With the foregoing construction, combinations of the engagement and the disengagement of the frictional clutches C1, C2, C3 and the frictional brakes B1, B2, B3 serving as the frictional engagement elements is selected by the hydraulic pressure control portion 3 and the electronic control portion 4.

Figure 2:
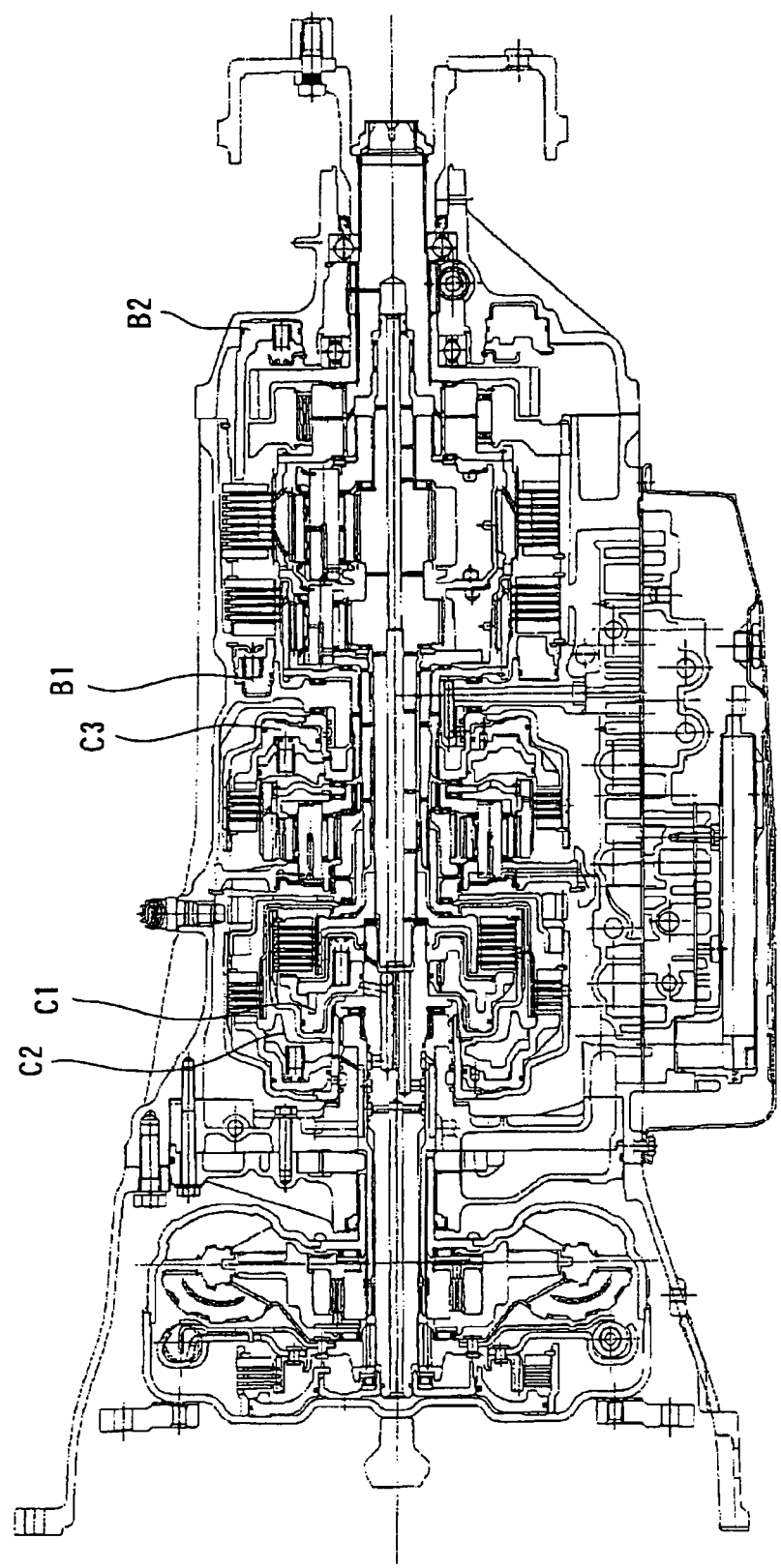
FIG. 2 shows a cross-sectional view of the automatic transmission according to the embodiment of the present invention.
Figures 3, 4:
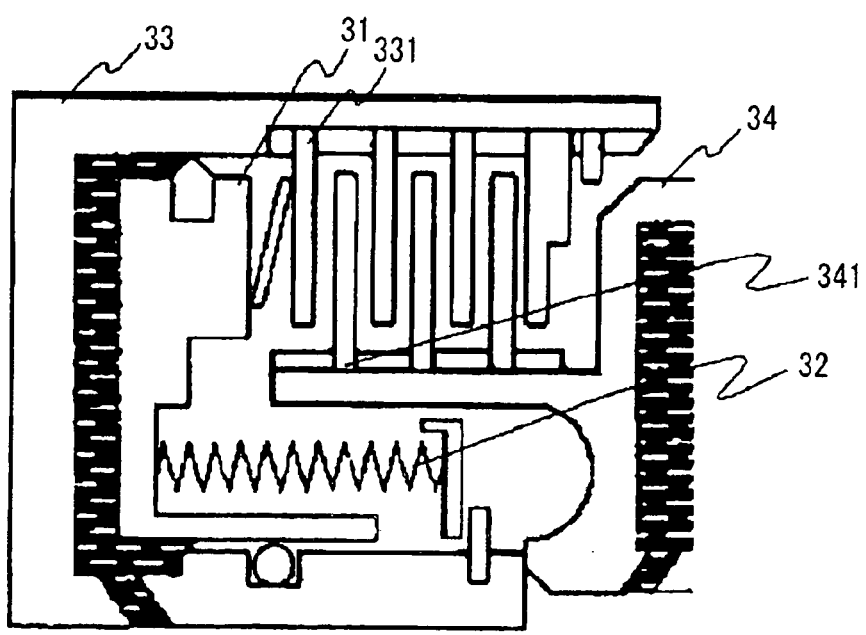
FIG. 3 shows a relationship of the engagement and the disengagement of frictional engagement elements and a shift range.
FIG. 4 is a cross-sectional pattern view of a wet-type multiple disc clutch serving as the frictional engagement element.

A cross-sectional view of a six speed automatic transmission is shown in FIG. 2. As shown in FIG. 3 illustrating the relationship of the engagement and the disengagement of the frictional engagement elements and the shift range (i.e., shift stage) of the automatic transmission, for example, a one way clutch (OWC) is released and the frictional brake B1 is engaged for the shift from first speed (i.e., C1, OWC engaged) to second speed (i.e., C1, B1 engaged). The shift from second speed (i.e., C1, B1 engaged) to third speed (i.e., C1, C3 engaged) is conducted by releasing the frictional brake B1 and engaging the frictional clutch C3.

As shown in FIG. 4, a wet-type multiple disc clutch, for example, serving as the frictional engagement element includes a piston 31, a return spring 32 serving as a reaction element of the piston 31, a driven plate 331 fitted to a clutch drum 33 side, and a drive plate 341 fitted to a clutch hub 34 side. When the piston 31 is pushed to each plate portion by the hydraulic pressure by the operation of the hydraulic pressure control portion 3, the friction is generated at the driven plate 331 and the drive plate 341 to transit to an engaged state for reducing turbine rotational speed Nt. When the hydraulic pressure is reduced by the operation of the hydraulic pressure control portion 3, the return spring 32 pushes the piston 31 to return to transit to a disengaged state.

The hydraulic pressure control portion 3 switches hydraulic pressure circuits therein for selecting the frictional engagement elements and controls the hydraulic pressure to be supplied for controlling the engagement and the disengagement of the frictional engagement elements based on a command of the electronic control portion 4.

The electronic control portion 4 corresponds to a computer for controlling the actuation of the hydraulic pressure control portion 3 based on inputted values from each sensor including a turbine rotation sensor 13 for detecting the turbine rotational speed Nt of the input shaft 11 (i.e., a turbine 10a) and a positional sensor 14 for detecting the position of a selector lever by the operation of an operator. The electronic control portion 4 includes a learning mode switching means 41 for conducting the transition to an operational mode for learning the precharge time and a precharge time determination means 42 for conducting the determination transaction of the precharge time. When a predetermined operation detectable by the computer including the electronic control portion 4 is conducted, the determination transaction of the precharge time starts.

The determination of the precharge time relative to the frictional brake B1 will be explained. For example, the selector lever is switched to D range and a predetermined operation is conducted when the aforementioned program for determination transaction is activated, and the electronic control portion 4 commands to provide the hydraulic pressure to the circuit so as to select sixth speed via the hydraulic pressure control portion 3 and to establish the pre-engagement of the frictional clutch C2.

Figure 5:
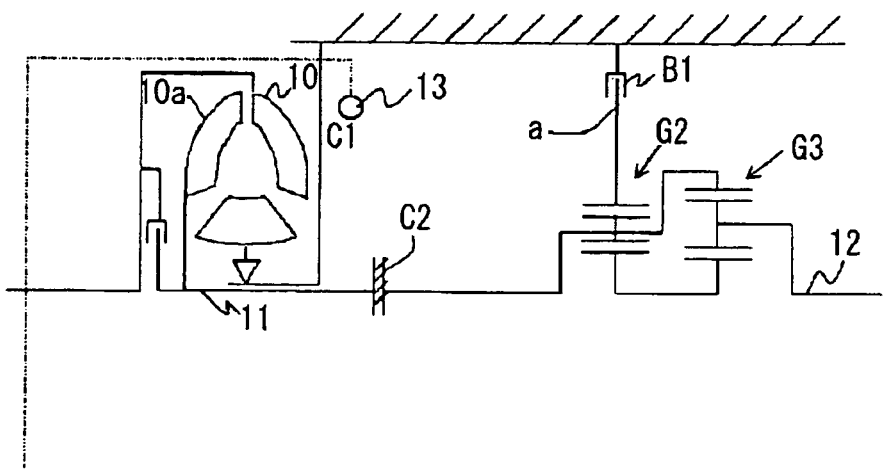
FIG. 5 is a schematic view equivalently showing a train state when the frictional engagement element is engaged in advance for determining the precharge time.

As shown in FIG. 5, the output shaft 12 is fixed by the wheel and the rotational speed of the frictional brake B1 to be transmitted with the rotation of the input shaft 11 via the single pinion planetary gear G2 (speed ratio $\rho 2$), G3 (speed ratio $\rho 3$) at a shaft side assumes $(1+\rho 2+\rho 2/\rho 3) \cdot Nt$ at the state that the engine is activated and the vehicle is stopped. On the other hand, the rotational speed at the case side of the frictional brake B1 is zero (0).

At the foregoing state, the electronic control portion 4 outputs the driving signal so that the hydraulic pressure of the frictional brake B1 assumes a precharge pressure Pi for test via the hydraulic pressure control portion 3 to transmit the frictional brake B1 to the engaged state. By the engagement of the shaft a side of the frictional brake to the fixed case side, the rotational speed, that is, the turbine rotational speed Nt is reduced.

Figure 6:
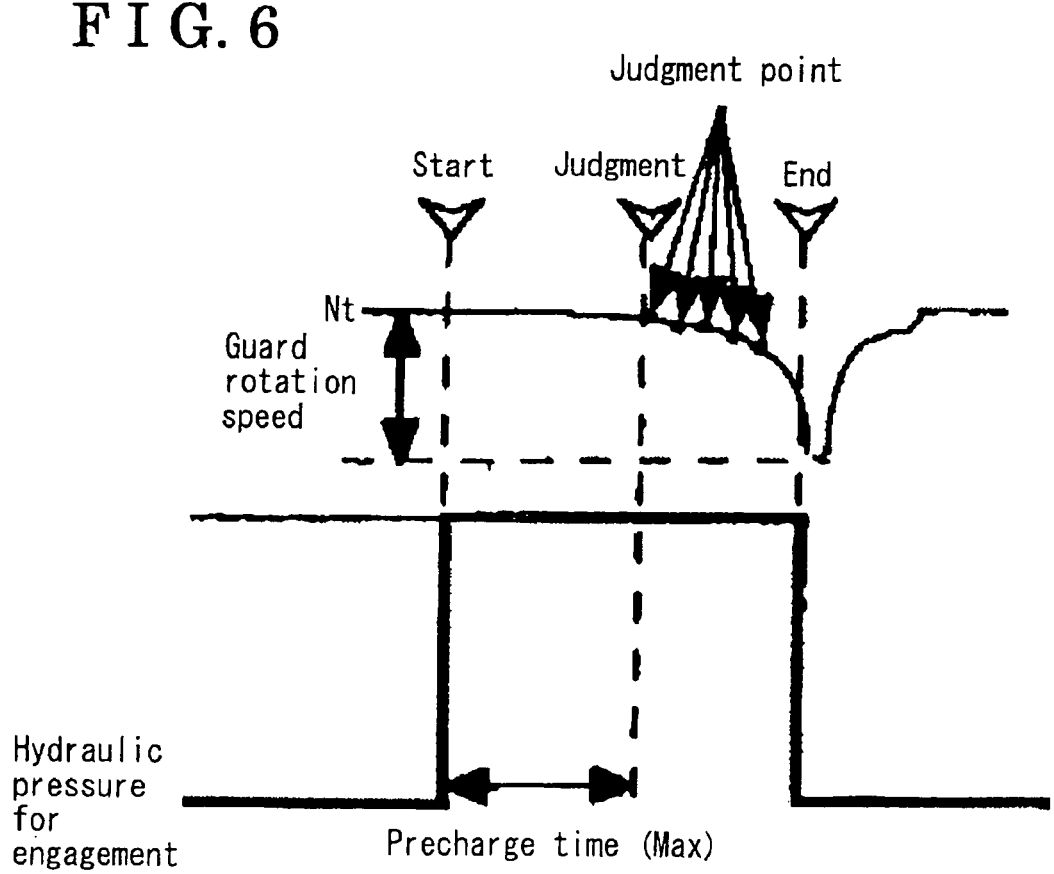
FIG. 6 shows the variation of turbine rotational speed Nt and hydraulic pressure waveform according to the embodiment of the present invention.

As shown in FIG. 6, the electronic control portion 4 commands the precharge time determination means 42 to monitor the turbine rotational speed Nt with a predetermined interval (i.e., sufficiently short judgment cycle, for example, 5 msec) until the turbine rotational speed Nt reaches a predetermined guard rotational speed. The precharge time determination means 42 judges that the piston is about to contact (i.e., precharge is established) (i.e., the judgment in FIG. 6) when the variation of the turbine rotational speed Nt reaches to satisfy a predetermined condition (e.g., the case that the turbine rotational speed shows the reducing tendency continuously for n times and the reduction tendency is not due to the noise) to obtain a precharge time ti by attaining the time interval between the judged time and a precharge control starting time.

Thereafter, the precharge time determination means 42 calculates the maximum precharge time tr for a precharge pressure Pr at the actual shift to be set for learning with Formula 1. $\alpha$ is a correction factor for considering the influences of the line pressure at the idling, or the like.

$$tr = \alpha \cdot \sqrt{\frac{Pi}{Pr}} \cdot ti \qquad \text{[Formula 1]}$$

Figure 7:
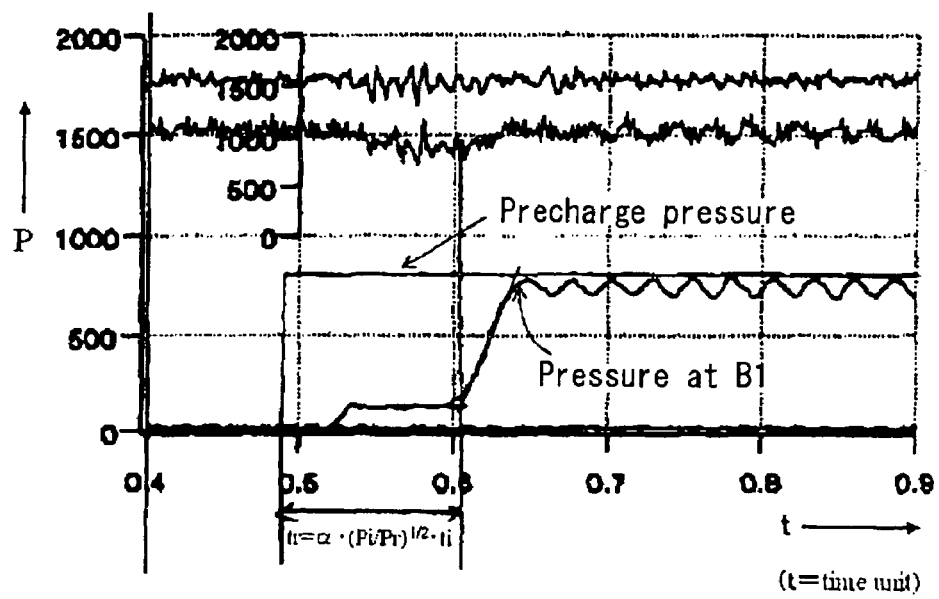
FIG. 7 shows an experimental result according to the embodiment of the present invention.
Figure 8:
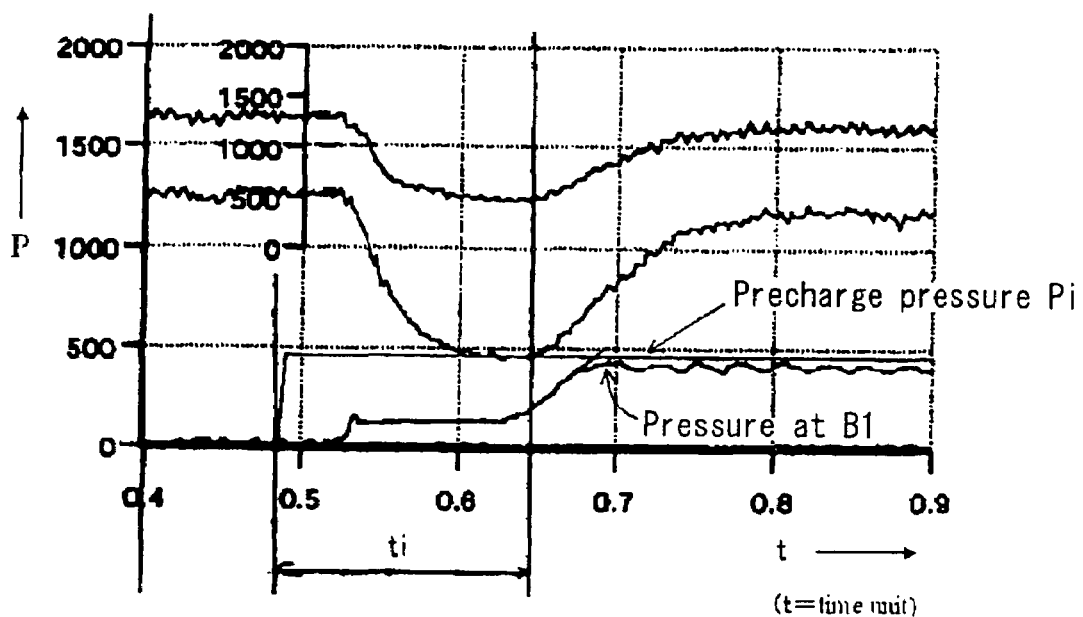
FIG. 8 shows an experimental result according to the embodiment of the present invention.

FIG. 7 shows the experimental result of the hydraulic pressure of the frictional brake B1 in case the piston is suddenly engaged at the precharge command pressure of 800 kPa used for the actual shift and at the input shaft rotation of 1500 rpm approximate to the actual shift in order to restrain the influence of the decline of the line pressure. FIG. 8 shows the experimental result of the hydraulic pressure of the frictional brake B1 in case actually the piston is suddenly engaged at the precharge command pressure of 450 kPa used for the precharge pressure Pi for the test and at the input shaft rotation of 600 rpm corresponding to the idling rotation. As shown in FIGS. 7–8, the precharge time tr under the condition corresponding to the actual shift of FIG. 7 is clearly shorter than the precharge time ti corresponding to the precharge time under the idling condition of FIG. 8. The relationship between the precharge time ti and the precharge time tr is shown as the following formula.

$$tr = \alpha \cdot (Pi/Pr)^{1/2} \cdot ti$$

By reading Pi corresponds to 450 kPa (i.e., Pi=450 kPa), Pr corresponds to 800 kPa (i.e., Pr=800 kPa), ti corresponds to 161 (msec) from FIGS. 7–8 and determining a correction factor $\alpha$ as 0.95 (i.e., $\alpha$=0.95) to substitute the values for the foregoing Formula 1, the following is attained.

$$tr = 0.95 \cdot (450/800)^{1/2} \cdot 161 \ (msec)$$
$$= 114 \ (msec)$$

The precharge time tr under the condition corresponding to the actual shift obtained from the foregoing formula approximately corresponds to the time interval from the immediately after the start of the precharge to a rise of the pressure at B1 of FIG. 7. Thus, it is confirmed that the precharge time at the actual shift state is attained with high precision.

Figure 9:
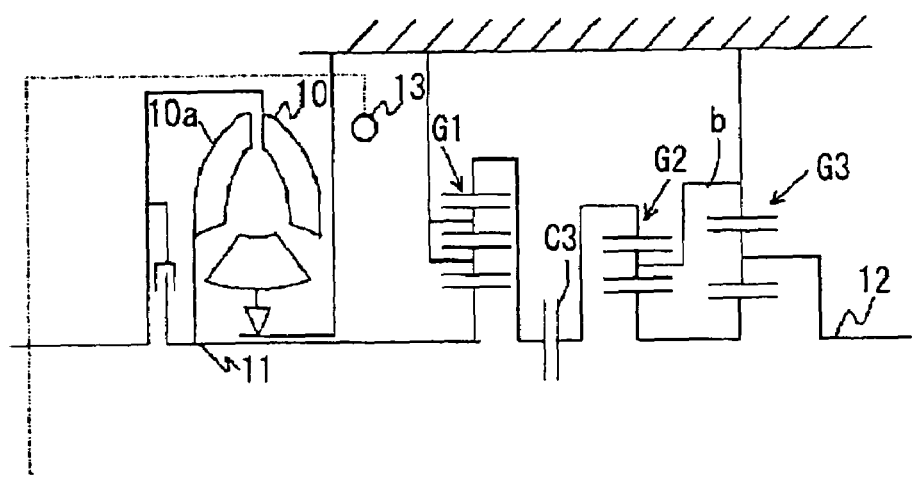
FIG. 9 shows a schematic view equivalently showing a train state when the frictional engagement element is engaged in advance for determining the precharge time.

Likewise, the determination of the precharge time relative to the frictional clutch C3 will be explained as follows. As shown in FIG. 9, the output shaft 12 is fixed by the wheels and the rotational speed of the frictional clutch C3 transmitted with the rotation of the input shaft via the single pinion planetary gear G1 (speed ratio ρ1) at the input side assumes ρ1·Nt. On the other hand, the rotational speed of the frictional clutch C3 at the output side assumes zero (0) because a shaft b is fixed by the pre-engaged frictional brake B2.

In the foregoing state, the electronic control portion 4 outputs the driving signal via the hydraulic pressure control portion 3 so that the hydraulic pressure of the frictional clutch C3 assumes the precharge pressure Pi for the test. Because the rotational speed, that is, the turbine rotational speed Nt is reduced by the engagement of the input side of the frictional clutch C3 with the fixed output side, the electronic control portion 4 commands the precharge time determination means 42 to monitor the turbine rotational speed Nt. The precharge time determination means 42 judges that the piston is about to contact (i.e., the precharge is established) (i.e., shown in FIG. 6) when the variation of the turbine rotational speed Nt satisfies a predetermined condition. In this case, the time interval between the judged time and the starting time of the precharge control is obtained as the precharge time ti, and the maximum precharge time tr at the precharge pressure Pr at the predetermined actual shaft is calculated from Formula 1 to be set for learning.

Figure 10:
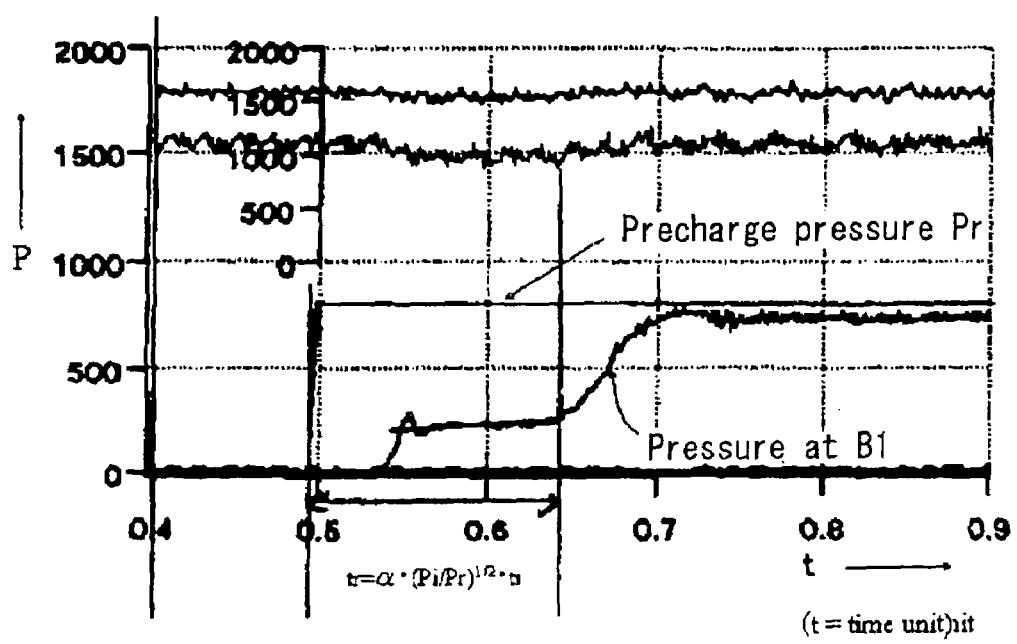
FIG. 10 shows an experimental result according to the embodiment of the present invention.
Figure 11:
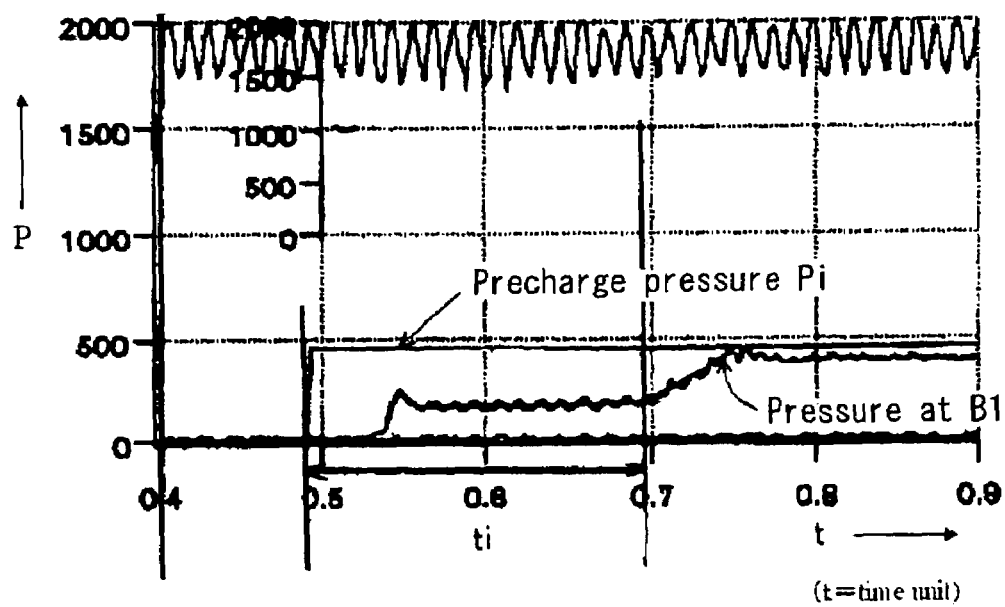
FIG. 11 shows an experimental result according to the embodiment of the present invention.
Figure 12:
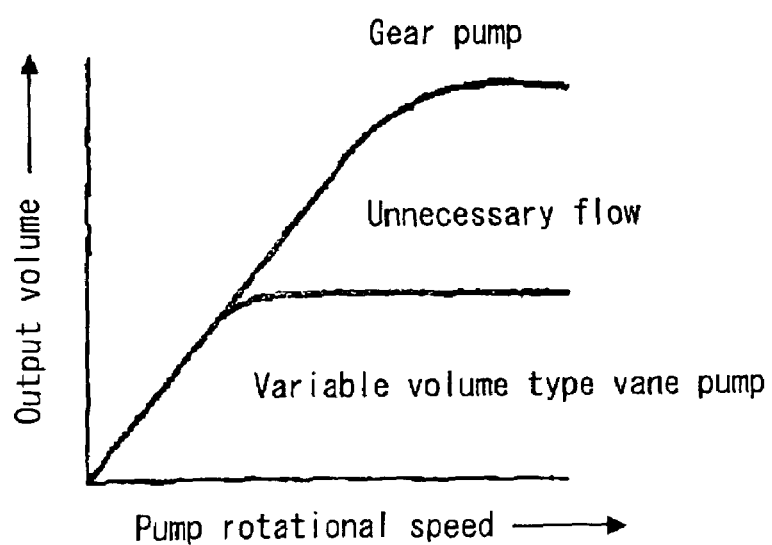
FIG. 12 shows an oil pump performance used for automatic transmission.
Figure 13:
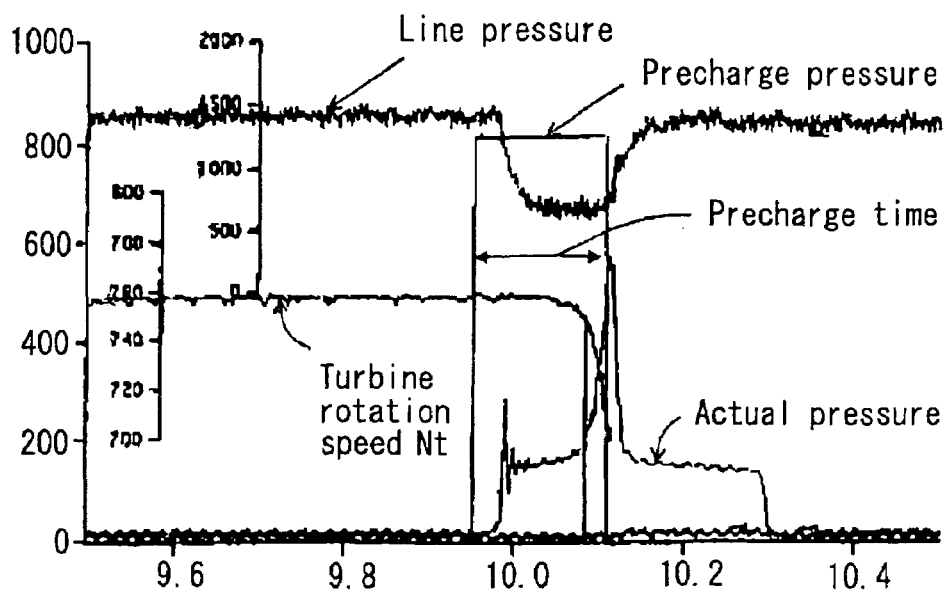
FIG. 13 is an explanatory view for explaining a test operation of a precharge time under a condition corresponding to an idling state.
Figure 14:
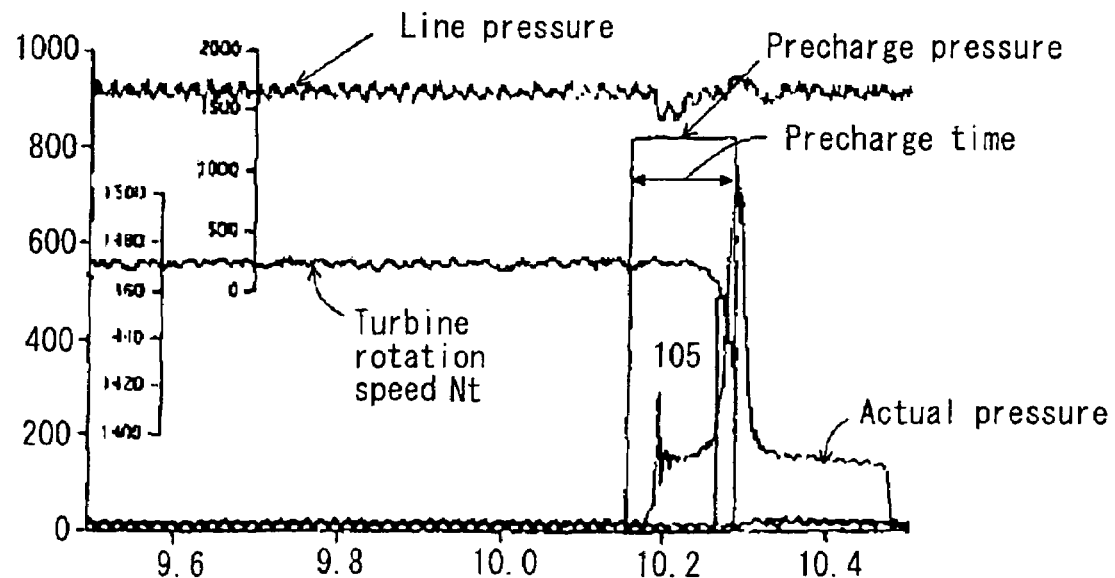
FIG. 14 is an explanatory view for explaining a test operation of a precharge time under a condition corresponding to a normal shift.

FIG. 10 shows the experimental result of the hydraulic pressure at the frictional clutch C3 when the piston is suddenly engaged when the precharge command pressure is determined at 800 kPa used for the actual shaft and the input shaft rotation speed is determined at 1500 rpm approximate to the actual shift in order to restrain the influence of the decline of the line pressure. FIG. 11 is an experimental result of the hydraulic pressure at the fictional clutch C3 when the piston is suddenly engaged when the input shaft rotation speed is determined at 600 rpm corresponding to the idling rotation and the precharge command pressure is determined at 450 kPa used for the precharge pressure Pi for the test. As shown in FIGS. 10–11, the precharge time tr under the condition corresponding to the actual shaft of FIG. 11 is significantly shorter than the precharge time ti under the idling condition. The relationship between the precharge time ti and the precharge time tr is as follows.

$$tr = \alpha \cdot (Pi/Pr)^{1/2} \cdot ti$$

Reading the precharge pressure Pi corresponds to 450 kPa (i.e., Pi=450 kPa), the precharge pressure Pr corresponds to 800 kPa (Pr=800 kPa), and the precharge time ti is 205 (msec) and determining the correction factor $\alpha$ as 0.95 ($\alpha$=0.95) to substitute the values for Formula 1, the following is attained.

$$tr = 0.95 \cdot (450/800)^{1/2} \cdot 205 (msec)$$

The precharge time tr under the condition corresponding to the actual shift obtained in the foregoing calculation approximately corresponds to the time interval immediately after the start of the precharge control to the rise of the pressure at B1. Thus, it is confirmed that the precharge time is attained with high precision even if the frictional engagement element is changed.

As foregoing, it is confirmed that the precharge time which has no problem for the practice is attained using Formula 1 as it is shown that the precharge time tr is approximately to be 0.7 ti by Formula 1 when the correction and the calculation are conducted at the command pressure 450 kPa for the test relative to the precharge command pressure 800 kPa of the actual shift state. Further precise calculation may be conducted instead of using Formula 1.

For example, the state of the hydraulic pressure system, for example, represented by the wet-type multiple disc clutch is shows in Formula 2 (i.e., continuous formula for fluid) and formula 3 (i.e., dynamic equation for piston).

$$\frac{dPc}{dt} = \frac{K}{V}\left(Qs - Ap\frac{dx}{dt} - Qb\right) \quad \text{[Formula 2]}$$

$$m\frac{d^2x}{dt^2} + C\frac{dx}{dt} + k \cdot x + Fset = Ap \cdot Pc \quad \text{[Formula 3]}$$

Here, Pc stands for hydraulic pressure for engagement, K stands for modulus of volume elasticity, V stands for volume, Qs stands for input flow, Qb stands for leakage amount, Ap stands for piston dimension, k·x+Fset stands for return spring force, m stands for piston mass, and C stands for damping factor. For example, the flow amount at the actuation for setting for learning may be calculated from Formula 2 and Formula 3 to divide the flow amount by $(Pr)^{1/2}$, or the like based on the precharge pressure Pr at the actual shift state for calculating the precharge time tr at the prehcarge pressure Pr at the actual shift.

The reliability may be further increased by pre-calculating or experimentally obtaining the specification including the minimum value and the maximum value of the precharge time limited by the manufacturing specification, or the like, of every frictional engagement element of the automatic transmission, confirming that the precharge time tr calculated by each method is included within the specification, and adding the post-transaction for re-testing or for failing the substandard quality.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An automatic transmission comprising:
a plurality of frictional engagement elements for constructing plural shift stages with combinations of engagement and disengagement thereof;
a control portion for controlling the engagement and the disengagement of the frictional engagement elements by controlling supplied hydraulic pressure;
a switching means for switching a mode to a learning mode for learning a precharge time; and
a precharge time determination means activated by switching to the learning mode, the precharge time determination means determining the precharge time based on an input value including at least turbine rotational speed; wherein
the precharge time determination means change the frictional engagement elements into an engagement side by maintaining the hydraulic pressure at the frictional engagement elements for determining the precharge time at a first precharge pressure by controlling the control portion while maintaining input shaft rotational speed of the automatic transmission when the automatic transmission is switched to the learning mode at a vehicle stop state;
a first precharge time defined from a start of maintaining the first precharge pressure until variation of an input value deriving from a decline of the turbine rotational speed assumes significant is obtained; and wherein
a second precharge time at a second precharge pressure is obtained to be set for learning by a predetermined formula.

2. An automatic transmission according to claim 1, wherein the plurality of frictional engagement elements are consisting of a wet-type multiple disc clutch.

3. An automatic transmission according to claim 1, wherein the control portion for controlling the engagement and the disengagement of the frictional engagement elements uses a turbine rotation sensor signal.

4. An automatic transmission comprising:
a plurality of frictional engagement elements for constructing plural shift stages with combinations of engagement and disengagement thereof;
a control portion for controlling the engagement and the disengagement of the frictional engagement elements by controlling supplied hydraulic pressure;
a switching means for switching a mode to a learning mode for learning a precharge time; and
a precharge time determination means activated by switching the mode to the learning mode, the precharge time determination means determining the precharge time based on an input value including at least turbine rotational speed; wherein
the precharge time determination means change the frictional engagement elements into an engagement side by maintaining the hydraulic pressure at the frictional engagement elements for determining the precharge time at a first precharge pressure Pi by controlling the control portion while maintaining input shaft rotational speed of the automatic transmission when the automatic transmission is switched to the learning mode at a vehicle stop state;
a second precharge time tr is obtained to be set for learning by a predetermined correction factor α, the first precharge pressure Pi, a first precharge time ti defined from starting to maintain the first precharge pressure Pi until variation of an input value deriving from a decline of turbine rotational speed assumes significant, and a second precharge pressure Pr; and wherein
the precharge time tr is obtained to be set for learning with a predetermined formula.

5. An automatic transmission according to claim 4, wherein the precharge time is obtained according to the formula of $$tr = \alpha \cdot \sqrt{\frac{Pi}{Pr}} \cdot ti$$

6. An automatic transmission according to claim 4, wherein the plurality of frictional engagement elements are consisting of a wet-type multiple disc clutch.

7. An automatic transmission according to claim 4, wherein the control portion for controlling the engagement and the disengagement of the frictional engagement elements uses a turbine rotation sensor signal.

8. A method for determining a precharge time comprising:
a plurality of frictional engagement elements constructing plural shift stages by combinations of engagement and disengagement thereof;
a control portion for controlling the engagement and the disengagement of the frictional engagement elements by controlling supplied hydraulic pressure; and
a precharge time determination means for determining a precharge time based on an input value including at least turbine rotational speed; wherein
the precharge time determination means change the frictional engagement elements into to an engagement side by maintaining hydraulic pressure at the frictional engagement elements for setting the precharge time at a first precharge pressure by the control portion while maintaining input shaft rotational speed of the automatic transmission at a vehicle stop state;
a first precharge time defined from a start of maintaining the first precharge pressure until variation of an input value deriving from a decline of turbine rotational speed is obtained; and wherein
a second precharge time at a second precharge time is obtained to be set for learning by a predetermined formula.

9. A method for determining a precharge time according to claim 8, wherein the plurality of frictional engagement elements are consisting of a wet-type multiple disc clutch.

10. A method for determining a precharge time according claim 8, wherein the control portion for controlling the engagement and the disengagement of the frictional engagement elements uses a turbine rotation sensor signal.

11. A method for determining a precharge time comprising:
- a plurality of frictional engagement elements constructing plural shift stages by combinations of engagement and disengagement thereof;
- a control portion for controlling the engagement and the disengagement of the frictional engagement elements by controlling supplied hydraulic pressure; and
- a precharge time determination means for determining a precharge time based on an input value including at least turbine rotational speed;
- wherein the precharge time determination means change the frictional engagement elements into an engagement side by maintaining hydraulic pressure at the frictional engagement elements for setting the precharge time at a first precharge pressure Pi by the control portion while maintaining input shaft rotational speed of the automatic transmission at a vehicle stop state;
- a precharge time tr is obtained to be set for learning by a predetermined correction factor α, the first precharge pressure Pi, a first precharge time ti defined from a start of maintaining the first precharge pressure Pi until variation of an input value deriving from a decline of turbine rotation speed assumes significant, and a second precharge pressure Pr; and wherein the precharge time tr is determined by a predetermined formula.

12. A method for determining a precharge time according to claim 11, wherein the precharge time is obtained according to the formula of $$tr = \alpha \cdot \sqrt{\frac{Pi}{Pr}} \cdot ti$$

13. A method for determining a precharge time according to claim 11, wherein the plurality of frictional engagement elements are consisting of a wet-type multiple disc clutch.

14. A method for determining a precharge time according to claim 11, wherein the control portion for controlling the engagement and the disengagement of the frictional engagement elements uses a turbine rotation sensor signal.

* * * * *